Patented Jan. 7, 1947

2,413,857

UNITED STATES PATENT OFFICE 2,413,857

VULCANIZABLE PRODUCTS AND THEIR MANUFACTURE

Frederick C. Bersworth, Verona, N. J., and Morris Omansky, Brookline, Mass., assignors, by direct and mesne assignments, to Frederick C. Bersworth No Drawing. Application July 17, 1943, Serial No. 495,206

13 Claims. (Cl. 260—36)

This invention relates to the plasticizing and modifying of rubber and more particularly to the incorporation of esters of polyamino polyacetic acids in rubber as modifying agents.

It has been found in working or processing rubbers and particularly synthetic rubbers, that it is desirable to add a substance, usually called a plasticizer, which will soften the rubber and thereby make working it or processing it easier. Such softeners as dibutyl phthalate, soft coal-tar products, tricresyl phosphate, and para-coumarone resins are commonly used. Although softening is highly desirable during processing, it is highly undesirable in the finished product, which should be as tough and strong as possible. The undesirable degradation of the finished rubber product is often a material factor as, for instance, if ten per cent by weight (based on the weight of rubber) of soft coal-tar is added, the product is degenerated to a greater extent than ten per cent. The rate of vulcanization during processing should be as near zero as possible, but this rate should be high under vulcanization conditions.

Chloroprene polymers, e. g. neoprene, are the most rubber-like of the synthetic rubbers in many of their properties and have the additional advantage of being resistant to oils, volatile solvents, sunlight, and ozone. These polymers are therefore highly desirable for use for example as a jacket for insulating wire carrying electric current. Chloroprene polymers have, however, the generally disadvantageous property of setting up much too rapidly after they have been mixed with other compounding ingredients such as zinc oxide, etc. Under some conditions neoprene will set up on storage, though usually the problem of premature setting up is not as important as that which takes place during processing and particularly when extruding. If neoprene sets up before it is sheeted out, subsequent operations are impractical or impossible to carry on. This difficulty has considerably limited the use of neoprene.

The primary purpose of the present invention is to set forth a material or class of materials which, when added to rubber, will act as a plasticizer during working or processing but will cease to act as a plasticizer or softener after vulcanization. None of the previously known plasticizers have this property. The modifying agents of this invention can hardly be called plasticizers since they function as plasticizers only during the working and finishing operation and do not act as such in the finished product.

A second purpose of this invention is to set forth a material or class of materials which, in addition to the property just described, decreases the rate of vulcanization during working or processing but either has no effect on, or increases the rate of, vulcanization under vulcanizing conditions.

Other purposes will appear in the more detailed explanation of the invention.

Briefly, these purposes may be accomplished by the incorporation of an ester of a polyamino polyacetic acid with the rubber mix.

The esters which may be advantageously incorporated with the rubber compounding ingredients to obtain the desired results may be defined in terms of the amino acid and in terms of the alcohol used for esterification. The method for preparing these esters is set forth in detail in a copending application of Frederick C. Bersworth, one of the present applicants, Ser. No. 491,670, filed June 21, 1943.

The polyamino polyacetic acid may be broadly defined by the formula:

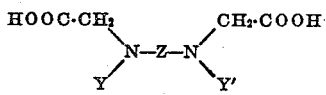

wherein Y and Y' are the same or different and are either hydrogen, —CH₂·COOH, an alkyl group, a cycloalkyl group, or an alkylol group; and Z is an alkylene group, an alkylene-ether group, an alkylol group, or a polyalkylene-amine group in which latter case the amino nitrogen atoms intermediate the polyalkylene chain are attached either to a hydrogen atom or to a —CH₂·COOH group. Of particular value in the present invention are the esters of the amino tetra (or higher) acetic acids, i. e. of those acids which correspond to the above formula wherein Y and Y' are —CH₂·COOH, and also wherein Z is an alkylene or a polyalkylene-amine group (i. e. >N—Z—N< is an alkylene-polyamine radical or a polyalkylene-polyamine radical).

Esters formed from any alcohol containing at least one esterifiable —OH group attached to a carbon atom which is not part of a benzene ring may be used advantageously. The esterification, however, is preferably complete as to all the free carboxylic acid groups of the amino acid, and must be complete as to at least two of them and there must, by definition, be at least two such free carboxylic acid groups. The esters used in the present process will therefore correspond to the foregoing formula except for the replacement of hydrogens of the carboxylic acid groups —COOH by R—, R— being the radical of an alcohol ROH.

The following is a general method for compounding rubber with the above defined esters. About 2 per cent by weight of the ester (based on the weight of rubber) is used in the presence of, or in the place of some of, the conventional compounding ingredients such as stearic acid, pine tar, natural or synthetic resins and paraffin wax. All the carbon black is incorporated into a part of the rubber stock (usually about two parts of carbon black to three parts of rubber, the rubber being preferably in massive form, and not as a latex) and is further mixed with or without other stabilizers, as desired. For instance, in the case of neoprene, light magnesium oxide is added. The ester is weighed onto the carbon black and is incorporated with it. However, the ester may be incorporated in any suitable manner at any stage of the mixing. To the mixture is added the balance of the rubber stock and the remainder of the compounding ingredients. The product is then sheeted out and manipulated for the purpose desired.

The effect of the addition of the ester to rubber is to act as a plasticizer, and as a vulcanization retarder, at processing temperatures, but does not appreciably influence the characteristics of the final product. Thus in the case of a compounded neoprene jacket it is found that the compound is less sensitive to elevated temperature normally encountered in processing stocks of this nature and yet permits vulcanization at usual times and temperatures. The final product has the good tensile strength and tear resistance required of an insulating material for a wire jacket.

Although about 2 or 3% by weight of the ester is the generally preferred quantity, any amount between about ½% and 10%, based on the rubber, will give the desired effect. The optimum quantity depends largely upon the particular rubber used and the nature and amounts of compounding ingredients. Both natural and synthetic rubber may advantageously be treated with the esters referred to herein. By synthetic rubber is meant the vulcanizable synthetic rubber-like products of the group consisting of chloroprene polymers (e. g. neoprene, or G. R. P.) and butadiene copolymers with acrylonitrile (e. g. Buna N, or G. R. N.) and with styrene (e. g. Buna S, or G. R. S.). It has been found that this invention is particularly useful in the processing of the two better known oil resistant synthetic rubbers G. R. N. and G. R. P.

In order to more fully understand the invention, but not to limit it, the following examples are given:

*Example I.*—Following the general procedure outlined above, the tetrabutyl ester of ethylene diamine tetraacetic acid was incorporated with neoprene, according to the following formula:

| | Parts by weight |
|---|---|
| Neoprene G. N. | 100 |
| Carbon black | 40 |
| Light magnesium oxide | 5 |
| Benzothiazyldisulfide | 1 |
| Brown factice | 5 |
| Phenyl beta naphthylamine | 1 |
| Zinc oxide | 5 |
| Tetrabutyl ester of ethylene diamine tetraacetic acid | 2 |

The above mix withstood two days storage at 60° C. without losing its plasticity whereas a mix of the same formula but wherein the ester was replaced by one part of stearic acid and one part of paraffin wax had lost its plasticity. But in spite of the superior retention of plasticity at elevated temperatures, stocks containing the ester vulcanized well in twenty minutes with seventy pounds steam pressure in a hydraulic press.

The vulcanized product, when tested, yielded the following values:

| Elongation percent | 100 | 200 | 300 | 400 | 500 | At break 525 |
|---|---|---|---|---|---|---|
| Tensile strength pounds per square inch | 410 | 1,120 | 1,920 | 2,780 | 3,620 | At break 3,940 |

It is to be noted that the intermediate values of tensile strength are high to produce the indicated elongation. This is an indication of superior resistance to wear.

*Example II.*—Following the same procedure as in Example I, natural rubber was employed. The mix contained the following ingredients:

| | Parts by weight |
|---|---|
| Smoked sheets | 100 |
| Carbon black | 45 |
| Zinc oxide | 4 |
| Benzothiazyldisulfide | 1.1 |
| Sulphur | 2.75 |
| Stearic acid | 3 |
| Diorthotolylguanidine | 0.3 |
| Tetrabutyl ester of ethylene diamine tetraacetic acid | 3 |

It is an interesting fact that in this mix the benzothiazyldisulfide acts as an accelerator while in Example I it acts as a stabilizer.

The following table shows the tensile strengths (pounds per square inch) of typical samples of the final rubber product obtained by the procedure of Example II.

| Elongation percent | 100 | 200 | 300 | 400 | 500 | 600 | At break 654 |
|---|---|---|---|---|---|---|---|
| Tensile strength | 220 | 680 | 1,400 | 2,100 | 3,180 | 4,020 | At break 4,540 |

The processing stock was more easily worked than normal stocks and was tacky. The carbon black was particularly well dispersed.

In accordance with the foregoing, similar results may be obtained with butadiene copolymers and particularly with the copolymer with acrylonitrile known as Buna-N or G. R. N.

We claim:

1. A vulcanizable product comprising a rubbery substance selected from the group consisting of natural rubber, chloroprene polymers, butadiene copolymers with acrylonitrile, and butadiene copolymers with styrene, and an ester of a polyamino polyacetic acid, said acid having the formula

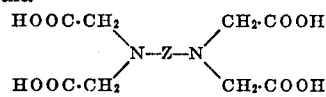

wherein Z is an alkylene group, said ester being at least a di-ester; said ester being present in said product in an amount not more than about 10% based upon the weight of said rubbery substance.

2. The product of claim 1 wherein said rubbery substance is natural rubber.

3. The product of claim 1 wherein said rubbery substance is a chloroprene polymer.

4. The product of claim 1 wherein said rubbery substance is a butadiene-acrylonitrile copolymer.

5. A vulcanizable product comprising a rubbery substance selected from the group consisting of natural rubber, chloroprene polymers, butadiene copolymers with acrylonitrile, and butadiene copolymers with styrene, and a tetra-ester of ethylene diamine tetraacetic acid in an amount by weight equal to between about 0.5% and about 10% on said rubbery substance.

6. The product of claim 5 wherein said ester is the tetrabutyl ester of ethylene diamine tetraacetic acid.

7. A vulcanized product consisting before vulcanization of a rubbery substance of the group consisting of natural rubber, chloroprene polymers, butadiene copolymers with acrylonitrile, and butadiene copolymers with styrene as the major ingredient, smaller amounts of compounding ingredients including accelerator, and between about 0.5% and about 10%, based on the weight of said rubbery substance, of an ester of a polyamino polyacetic acid which acid has the formula

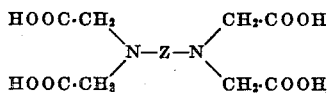

wherein Z is an alkylene group, said acid having been esterified with respect to at least two of its carboxylic acid groups.

8. A vulcanized product consisting before vulcanization of a rubbery substance of the group consisting of natural rubber, chloroprene polymers, butadiene copolymers with acrylonitrile, and butadiene copolymers with styrene as the major ingredient, smaller amounts of compounding ingredients including accelerator, and between about 0.5% and about 10%, based on the weight of said rubbery substance, of an ester of a polyamino polyacetic acid, said ester having the formula

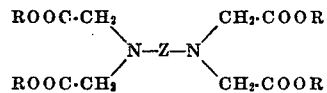

wherein Z is an alkylene group and R is the radical of an alcohol ROH.

9. A vulcanized product consisting before vulcanization of a rubbery substance of the group consisting of natural rubber, chloroprene polymers, butadiene copolymers with acrylonitrile, and butadiene copolymers with styrene as the major ingredient, smaller amounts of compounding ingredients including accelerator, and an ester of ethylene diamine tetraacetic acid in an amount by weight equal to between about 0.5% and about 10% on said rubbery substance; said ester being at least a di-ester.

10. The product of claim 9 wherein said rubbery substance is natural rubber.

11. The product of claim 9 wherein said rubbery substance is a chloroprene polymer.

12. The product of claim 9 wherein said rubbery substance is a butadiene-acrylonitrile copolymer.

13. The product of claim 9 wherein said ester is a tetraester.

FREDERICK C. BERSWORTH.
MORRIS OMANSKY.